No. 655,247. Patented Aug. 7, 1900.
J. KLÖVSTAD & G. W. JONSEN.
CARRIAGE.
(Application filed Apr. 10, 1900.)
(No Model.)
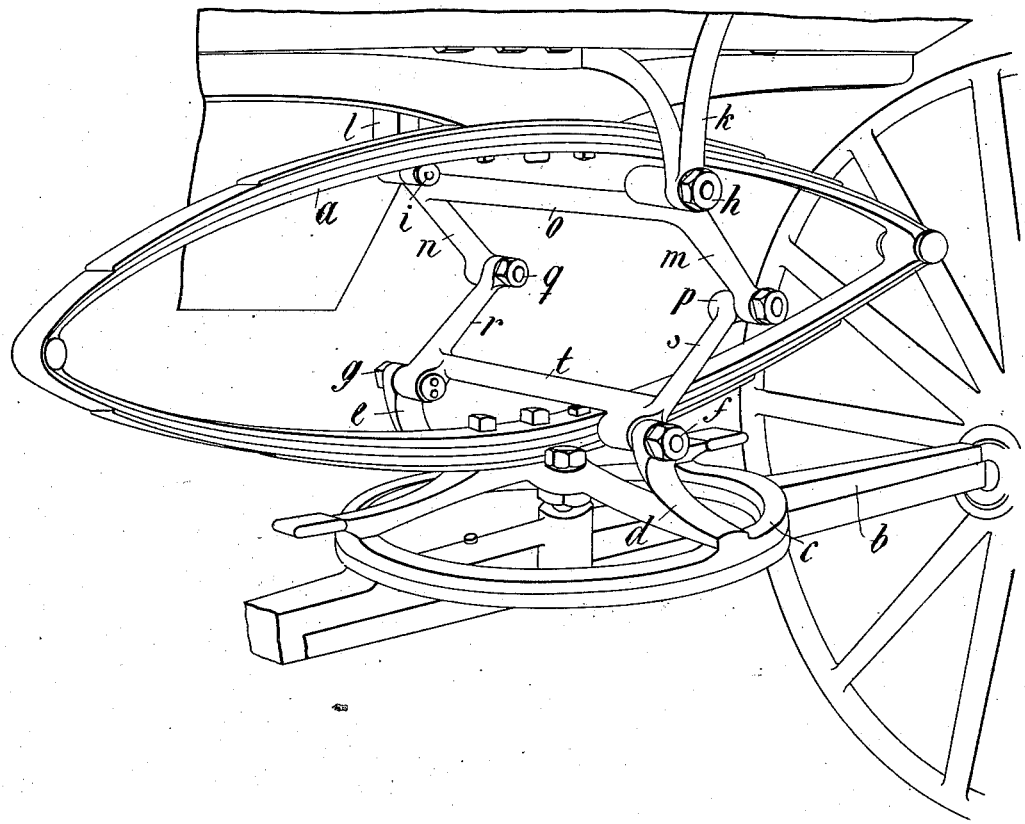
WITNESSES:
INVENTORS.
Jörgen Klövstad
Gustav Wilhelm Jonsen
ATTORNEYS

UNITED STATES PATENT OFFICE.

JÖRGEN KLÖVSTAD AND GUSTAV WILHELM JONSEN, OF CHRISTIANIA, NORWAY.

CARRIAGE.

SPECIFICATION forming part of Letters Patent No. 655,247, dated August 7, 1900.

Application filed April 10, 1900. Serial No. 12,343. (No model.)

*To all whom it may concern:*

Be it known that we, JÖRGEN KLÖVSTAD, carriage manufacturer, and GUSTAV WILHELM JONSEN, carriagesmith, citizens of the Kingdom of Norway, residing at 39 Hoellergaden, Christiania, Norway, have invented certain new and useful Improvements in Carriages or Vehicles; and we do hereby declare the following to be a full, clear, and exact description of the invention, such as will enable others skilled in the art to which it appertains to make and use the same.

In the carriages or vehicles which are at present most generally in use the front axle is provided with two springs mounted upon the fifth-wheel lengthwise of the carriage. The arrangement known from American constructions and having only one spring situated opposite the front axle transversely to the carriage provides not only a nicer appearance of the vehicle, but also enables to considerably to reduce the weight, and besides possesses the advantage of having the spring rigidly attached to the body of the carriage and not, as usually, to the axle. When, however, said arrangement has not come into common use, this is substantially due to the fact that in the general form of carrying out the same it will impair to a considerable degree the swinging of the front wheels, (allowing only of half a turn,) this involving difficulties in the use of such carriages when turning with the same in narrow passages.

The object of the present invention is to provide an arrangement of the last-named character, but adapted to maintain a full turn. This is obtained by omitting the stay generally used in carriages of this description to connect the front and rear axles and serving to prevent the former from yielding longitudinally and by providing the front axle instead of said stay with guides adapted to prevent any yielding of the frame in the longitudinal direction. According to the present invention such guides are provided in the form of a couple of parallel axles connected with each other by a kind of toggle-joints and journaled lengthwise of the vehicle, one underneath the bottom of the same and the other on the fifth-wheel.

The accompanying drawing illustrates an arrangement embodying the present invention.

The carriage-spring $a$ is attached transversely, as shown, to a cross-piece mounted upon the fifth-wheel $c$. Projecting upward from the latter are lugs or journal-bearings $d\ e$, carrying bolts $f\ g$, that form one of the axles of the toggle-joint, while the other is formed by similar bolts $h\ i$, inserted into pendent brackets $k\ l$, secured to the bottom of the carriage. A double lever consisting of parallel arms $m\ n$, connected by the cross-bar $o$, is suspended upon the upper bolts and jointed by bolts $p\ q$ to a similar double lever pivoted on the lower axle and comprising arms $r\ s$, connected by a cross-bar $t$. The several bolts are made of a sufficient length and may, if desired, be extended, so as to form continuous axles. The bolts are preferably made of a tapering form, so as to be capable of being tightened when worn away in order to obviate jolting of the carriage. A mechanism of this description will allow of free movement vertically without causing undue friction and at the same time precludes any angular movement of one of the toggle-joints relatively to the other, and consequently secures against any yielding of the carriage-frame in the longitudinal direction. Such arrangement of the frame secures a reduction in weight by forty to fifty kilograms. The placing of the spring upon the body of the carriage, furthermore, involves the advantage that damages caused by collisions or other accidents will be more easily and cheaply repairable, the frame, which will more particularly be liable to receive such damages, comprising in this case only the axle and the lower fifth-wheel.

We claim—

1. In combination in a vehicle, the body, the front shaft, a fifth-wheel mounted thereon, an elliptical spring interposed between the same and the body, integral arms extending upwardly from the fifth-wheel and toggle-arms interposed between the same and the body, substantially as described.

2. In combination in a vehicle, the body, the front shaft, a fifth-wheel mounted thereon, the spring interposed between said wheel and the body and a toggle-frame interposed between the fifth-wheel and carriage-body arranged transversely of the spring, substantially as described.

In witness whereof we have hereunto set our hands in presence of two witnesses.

JÖRGEN KLÖVSTAD.
GUSTAV WILHELM JONSEN.

Witnesses:
THS. BERG,
JOH. VAALER.